(12) United States Patent
Lorenzen et al.

(10) Patent No.: US 7,587,255 B1
(45) Date of Patent: *Sep. 8, 2009

(54) SOFTWARE AND PROCESS FOR PLAY-CURSOR CALCULATION

(75) Inventors: Erik Lorenzen, Mesa, AZ (US); Keith Weiner, Queen Creek, AZ (US)

(73) Assignee: DiamondWare, Ltd., Mesa, AZ (US)

( * ) Notice: Subject to any disclaimer, the term of this patent is extended or adjusted under 35 U.S.C. 154(b) by 173 days.

This patent is subject to a terminal disclaimer.

(21) Appl. No.: 11/799,776

(22) Filed: May 2, 2007

Related U.S. Application Data

(63) Continuation of application No. 09/949,267, filed on Sep. 7, 2001, now Pat. No. 7,218,977.

(60) Provisional application No. 60/231,470, filed on Sep. 8, 2000.

(51) Int. Cl.
*G06F 17/00* (2006.01)
*G06F 3/00* (2006.01)

(52) U.S. Cl. ............... 700/94; 710/52; 710/58
(58) Field of Classification Search ............. 700/94; 710/52, 58
See application file for complete search history.

(56) References Cited

U.S. PATENT DOCUMENTS

| 5,263,056 | A | 11/1993 | Urbansky |
| 5,337,315 | A | 8/1994 | Ehrlich |
| 5,596,420 | A | 1/1997 | Daum |
| 5,875,354 | A | 2/1999 | Charlton et al. |
| 5,918,073 | A | 6/1999 | Hewitt |
| 6,233,629 | B1 | 5/2001 | Castellano |
| 6,457,097 | B1 | 9/2002 | Tamura |
| 2003/0215096 | A1 | 11/2003 | Graumann et al. |

*Primary Examiner*—Curtis Kuntz
*Assistant Examiner*—Daniel R Sellers
(74) *Attorney, Agent, or Firm*—Law Office of Karen Dana Oster, LLC

(57) ABSTRACT

A process and software for achieving minimal latency in digital audio playback, which includes calculating a repeatable play cursor lead and a play cursor position and writing audio data at the play cursor position plus the play cursor lead.

18 Claims, 2 Drawing Sheets

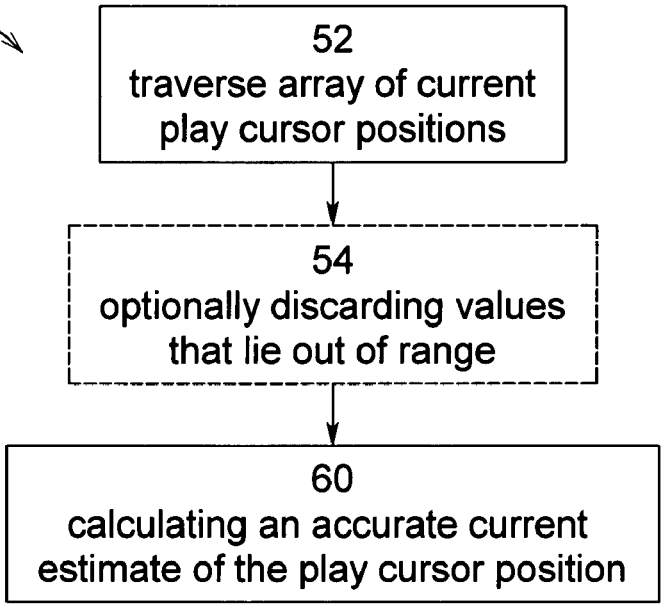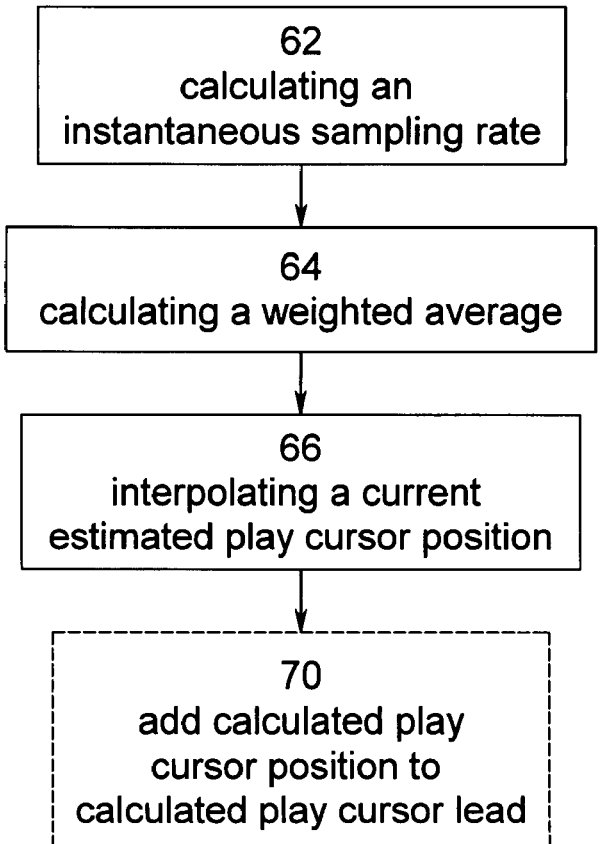

SOFTWARE AND PROCESS FOR PLAY-CURSOR CALCULATION

The present application is a continuation of U.S. patent application Ser. No. 09/949,267, filed Sep. 7, 2001, now U.S. Pat. No. 7,218,977. U.S. patent application Ser. No. 09/949,267 claims the benefit of the priority date of U.S. Provisional Patent Application Ser. No. 60/231,470, filed Sep. 8, 2000. The present application is based on and claims priority from these applications, the disclosures of which are hereby expressly incorporated herein by reference.

FIELD OF THE INVENTION

The invention pertains to the field of computer software programs and processes, and more specifically to the field of computer programs and processes for low rendering latency in telephony and in applications that mix multiple audio streams.

BACKGROUND OF INVENTION

In playback of digital audio on computers, software must write each buffer ahead of the play cursor, such that there is a guarantee that the buffer will be played from start to end, i.e. when the play cursor advances to the location of the buffer. If the buffer is written such that the play cursor is already advanced past the beginning of where the buffer is written, then part of the buffer will not be played and there will be discontinuity in the audio signal. Neither of these conditions is acceptable.

In conventional architecture, the program typically queries the operating system or audio driver for the current play cursor position. This yields a value that is neither accurate nor precise. In some cases, the driver or operating system adds additional padding, and in some cases the program itself does this step. The result is additional latency, which is undesirable.

A need exists for a process, preferably a software process, to reduce or eliminate this type of latency in audio playback.

A computer-readable media, such as a compact disc (CD), storing software programs and processes comprises instructions to a computer to perform the invention.

In a preferred embodiment, the invention is a software program for initial calibration and highly accurate on-demand calculation of the play cursor position in a computer audio system, for the purpose of digital audio playback.

In another preferred embodiment, the invention is a process for initial calibration and highly accurate on-demand calculation of the play cursor position in a computer audio system, for the purpose of digital audio playback.

BRIEF DESCRIPTION OF THE SEVERAL VIEWS OF THE DRAWINGS

FIG. 3 is a flow chart detailing the second thread of the step of calculating a current estimate of the play cursor position.

FIG. 4 is a flow chart detailing the step of calculating an accurate current estimate of the play cursor position.

DETAILED DESCRIPTION OF THE INVENTION

The "play cursor" is defined as the position within an audio buffer at which the next read operation by the audio API, device driver, or hardware will occur, regardless of whether it is to play the sound directly or to mix the sound into another audio buffer. The play cursor may increment by single samples or by larger chunks. Chunky cursor position movement may contain jitter. "Play cursor lead" is defined as the margin for writing ahead of the reported cursor position. This lead is designed to guarantee that a high-performance audio engine can write ahead of the play cursor.

The "write cursor position" is defined as the play cursor position plus the play cursor lead.

"Latency" is defined as the elapsed time between when an audio event is triggered and when it plays from the speakers. Large play cursor leads contribute to higher latencies.

The invention pertains to low rendering latency in telephony and in applications that mix multiple audio streams. By maintaining an accurate play cursor position, a program is able to use a minimal play cursor lead. This provides improved audio playback latency compared to conventional techniques.

In a preferred embodiment, the invention is part of a software program or a process used with the Windows® operating system with the program preferably using the Direct-Sound® APIs.

In one embodiment, the invention is a process or a software program for capturing and simultaneously rendering for the purpose of measuring and calibrating parameters in order to achieve minimal latency. In another embodiment, the invention is a process or a software program for maintaining reported cursor positions, accurately estimating current position, and writing audio data at a determined safe "lead" relative to the calculated current cursor position.

Figure 1:
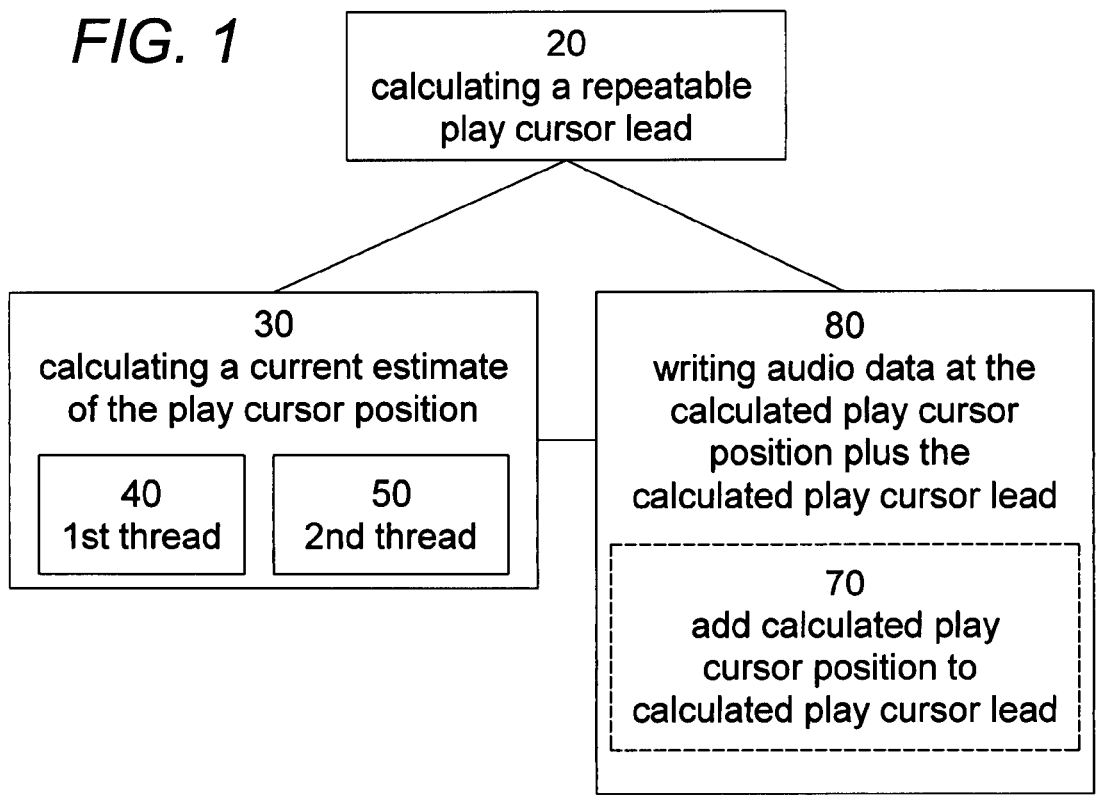
FIG. 1 is a flowchart showing steps of the present invention including calculating a repeatable play cursor lead, calculating a current estimate of the play cursor position, and writing audio data at the calculated play cursor position plus the calculated play cursor lead.

First, the program must determine the play cursor lead 20 (FIG. 1). Play cursor lead is different for every hardware driver and operating system revision, but it is constant on a given computer configuration.

The calculation is performed by testing many play cursor leads to determine the lowest value at which valid output is produced.

To test for valid output, a short pulse of known duration is written into the playback buffer. Simultaneously, the program captures the digital audio playback. Methods for capturing from playback include, but are not limited to, aiming the microphone at the speakers, connecting the microphone or line-in jack to the speaker or line-out jack, or by configuring the internal mixer in the sound hardware.

When the captured pulse has the same duration as the written playback pulse, this means that the write position was valid because the pulse was captured in its entirety.

The difference between the best play cursor position and the reported play cursor position is the play cursor lead. One may elect not to use the best possible play cursor position to allow more safety margin to compensate for high CPU loads, operating system non-determinism, etc.

Play cursor lead may be positive or negative.

Figure 2:
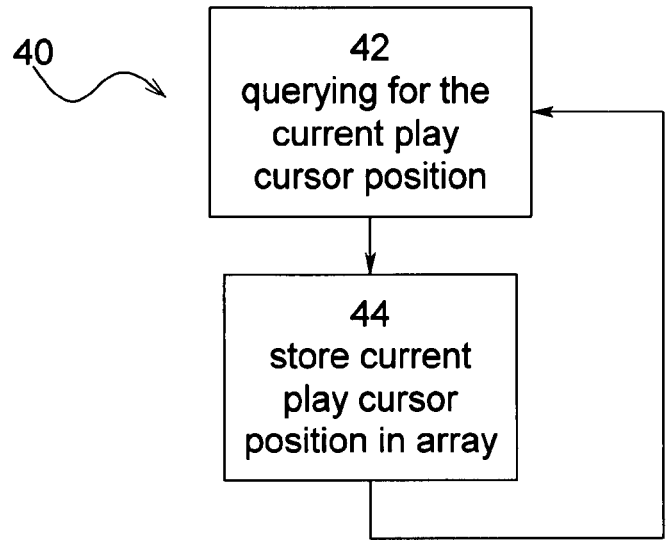
FIG. 2 is a flow chart detailing the first thread of the step of calculating a current estimate of the play cursor position.

Once this calibration phase is complete, the program can enter into playback mode. In this mode, the program executes two asynchronous threads 40 (FIGS. 1 and 2) and 50 (FIGS. 1 and 3) for calculating a current estimate of the play cursor position. The first thread 40 periodically queries Direct-Sound® for the current play cursor position 42 (FIG. 2). It stores the value in a circular array 44 (FIG. 2). The purpose of the array is to store a quantity of time-stamped cursor positions over a long period of time. The sampling interval is typically, but not necessarily, on the order of 5 ms, and the array typically, but not necessarily, contains a history of the previous 20 cursor positions.

The second thread 50 is for writing new streaming audio buffers to the output audio buffer. This thread must know the exact play cursor position, so that it can decide if it must write more digital audio to the play buffer, and if so where and how much.

In this thread, the array of time-stamped play cursor positions is traversed 52. Values that lie out of range may optionally be discarded 54. An instantaneous sampling rate is calculated 62 for each position based on the number of samples of change divided by the elapsed time since the last recorded cursor position. A weighted average 64 of these calculated sampling rates is used to interpolate 66 a current estimated play cursor position.

Adding the play cursor lead may be done at this time 70 (FIG. 4), or it is equally preferable to add it in when the play cursor positions are written into the array 70 (FIG. 1).

With this method, the program has highly accurate play cursor position information. The more accurate this information, the less additional safety margin is required, and thus the lower the achieved latency.

The process of the invention contains the following steps and the software contains instructions to perform the following steps:

a) calculate a repeatable play cursor lead 20 (FIG. 1),
b) calculate a current estimate of the play cursor position 30 (FIG. 1), and
c) write audio data at the calculated play cursor position plus the calculated play cursor lead 80 (FIG. 1).

Preferably, the process contains the following steps and the software preferably contains instructions to perform the following steps:

a) calculate a repeatable play cursor lead 20 (FIG. 1),
b) periodically and frequently query for the current reported play cursor position 42 (FIG. 2),
c) maintain a list of time-stamped values of the play cursor positions 44 (FIG. 2),
d) calculate, preferably by interpolation, an accurate current estimate of the play cursor position by weighted average, optionally discarding spurious values 60, 62, 64, 66 (FIGS. 3 and 4), and
e) write audio data at play cursor position plus lead 80 (FIG. 1).

The above description is not to be construed as limiting the invention, but is an illustration of the invention. The example is described in reference to the Windows® operating system. However, the invention is applicable to virtually any current or future operating system including but not limited to Windows 95®, Windows 98®, Windows CE®, Windows Me®, Windows NT®, Windows2000®, Linux®, MacOS®, and BeOS®. The example uses the DirectSound® API, but could use virtually any current or future audio API including but not limited to WaveOut®, Linux® sound drivers, etc.

The program as shown in Exhibit 1 is illustrative of software programs of the invention that may be used in the process of the invention to provide very low-latency digital audio.

The invention permits the performance of the following functions, which are not to be construed as limiting the invention:

(1) Determining the error in cursor-position reporting by the audio API and/or operating system,
(2) Establishing the initial play cursor position,
(3) Sampling the play cursor position periodically,
(4) Storing recent historical cursor positions with timestamps of when they occurred,
(5) Interpolating the play cursor position on demand, and
(6) Real-time capture of a program's own digital audio playback for the purpose of determining, calibrating, or adjusting the program's playback, record, timing, process, thread, or semaphore parameters, settings, or usage.

The software and process of the invention provides many practical applications. For example, the invention may be used in:

(1) Computer telephony,
(2) Multi-user chat, including games,
(3) Internet radio station broadcast, and
(4) Synthesizers and other real-time music applications.

Exhibit 1 (Exhibit1.txt, Apr. 26, 2007, 46 KB) is a source code for an exemplary program as described above, which contains the following software components:

PCLD.C, PCLD.H, RATE.C, and RATE.H

These software components are included on the two CDs that are submitted with this application, and this material on the CDs is incorporated into this specification by reference.

Although the above description, including Exhibit 1, contains many specificities, they should not be interpreted as limitations on the scope of the invention, but rather as illustrations. One skilled in the art will understand that many variations of the invention are possible and that these variations are to be included within the scope of the invention, as defined in the following claims.

What is claimed is:

1. A computer-readable media storing a program, said program comprising instructions to a computer to perform the steps of;
   a) calculating a repeatable play cursor lead;
   b) calculating a current estimate of a play cursor position, said step of calculating a current estimate of a play cursor position further comprising the steps of:
      i) periodically querying for a current reported play cursor position; and
      ii) using a plurality of said reported play cursor positions obtained as a result of said step of periodic querying in said step of calculating a current estimate of a play cursor position;
   c) adding the calculated play cursor position to the calculated play cursor lead; and
   d) writing audio data to an audio buffer at the calculated play cursor position plus the calculated play cursor lead;
   wherein said step of adding the calculated play cursor position to the calculated play cursor lead is performed prior to said step of using a plurality of said reported play cursor positions obtained as a result of said step of periodic querying in said step of calculating a current estimate of a play cursor position.

2. The computer-readable media of claim 1, said program further comprising instructions to perform the step of reducing latency by reducing said play cursor lead.

3. The computer-readable media of claim 1, said program further comprising instructions to perform the step of maintaining a list of said reported play cursor positions obtained as a result of said step of periodic querying.

4. The computer-readable media of claim 3, said program further comprising instructions to perform the step of estimating the play cursor position by averaging the play cursor positions in said list.

5. The computer-readable media of claim 1. said program further comprising instructions to perform at least one step selected from the group of steps consisting of:

a) calculating an instantaneous sampling rate as an intermediate step of calculating a current estimate of a play cursor position;
b) calculating a weighted average as an intermediate step of calculating a current estimate of a play cursor position; and
c) interpolating a current estimated play cursor position as an intermediate step of calculating a current estimate of a play cursor position.

6. A computer-readable media storing a program, said program comprising instructions to a computer to perform the steps of:
a) calculating a repeatable play cursor lead;
b) calculating a current estimate of a play cursor position, said step of calculating a current estimate of a play cursor position further comprising the steps of:
   i) periodically querying for a current reported play cursor position; and
   ii) using a plurality of said reported play cursor positions obtained as a result of said step of periodic querying in said step of calculating a current estimate of a play cursor position;
c) adding the calculated play cursor position to the calculated play cursor lead;
d) writing audio data to an audio buffer at the calculated play cursor position plus the calculated play cursor lead;
e) at least one step selected from the group of steps consisting of:
   i) calculating an instantaneous sampling rate as an intermediate step of calculating a current estimate of a play cursor position;
   ii) calculating a weighted average as an intermediate step of calculating a current estimate of a play cursor position; and
   iii) interpolating a current estimated play cursor position as an intermediate step of calculating a current estimate of a play cursor position;
f) reducing latency by reducing said play cursor lead based on the accuracy of said current estimate of a play cursor position.

7. A process for reducing latency in digital audio playback, said process comprising the steps of:
a) calculating a repeatable play cursor lead;
b) calculating a current estimate of the play cursor position, said step of calculating a current estimate of a play cursor position further comprising the steps of:
   i) periodically querying for a current reported play cursor position; and
   ii) using a plurality of said reported play cursor positions obtained as a result of said step of periodic querying in said step of calculating a current estimate of a play cursor position;
c) adding the calculated play cursor position to the calculated play cursor lead; and
d) writing audio data to an audio buffer at the calculated play cursor position plus the calculated play cursor lead;
e) said step of adding the calculated play cursor position to the calculated play cursor lead is performed prior to said step of using a plurality of said reported play cursor positions obtained as a result of said step of periodic querying in said step of calculating a current estimate of a play cursor position.

8. The process of claim 7 further comprising the step of reducing latency by reducing said play cursor lead.

9. The process of claim 7 further comprising the step of maintaining a list of said reported play cursor positions obtained as a result of said periodic querying step.

10. The process of claim 9 further comprising the step of calculating an estimate of the play cursor position by averaging said reported play cursor positions in said list of play cursor positions.

11. The process of claim 7 further comprising at least one step selected from the group of steps consisting of:
a) calculating an instantaneous sampling rate as an intermediate step of calculating a current estimate of a play cursor position;
b) calculating a weighted average as an intermediate step of calculating a current estimate of a play cursor position; and
c) interpolating a current estimated play cursor position as an intermediate step of calculating a current estimate of a play cursor position.

12. A process for reducing latency in digital audio playback, said process comprising the steps of:
a) calculating a repeatable play cursor lead;
b) calculating a current estimate of the play cursor position, said step of calculating a current estimate of a play cursor position further comprising the steps of:
   i) periodically querying for a current reported play cursor position; and
   ii) using a plurality of said reported play cursor positions obtained as a result of said step of periodic querying in said step of calculating a current estimate of a play cursor position;
c) adding the calculated play cursor position to the calculated play cursor lead;
d) writing audio data to an audio buffer at the calculated play cursor position plus the calculated play cursor lead;
e) at least one step selected from the group of steps consisting of:
   i) calculating an instantaneous sampling rate as an intermediate step of calculating a current estimate of a play cursor position;
   ii) calculating a weighted average as an intermediate step of calculating a current estimate of a play cursor position; and
   iii) interpolating a current estimated play cursor position as an intermediate step of calculating a current estimate of a play cursor position; and
f) reducing latency by reducing said play cursor lead based on the accuracy of said current estimate of a play cursor position.

13. A process for reducing latency in digital audio playback, said process comprising the steps of:
a) calculating a repeatable play cursor lead;
b) querying for a current reported play cursor position and using a plurality of said current reported play cursor positions in said step of calculating a current estimate of a play cursor position;
c) calculating a current estimate of the play cursor position based on a plurality of said current reported play cursor positions;
d) adding the calculated play cursor position to the calculated play cursor lead; and
e) writing audio data to an audio buffer at the calculated play cursor position plus the calculated play cursor lead;
wherein said step of adding the calculated play cursor position to the calculated play cursor lead is performed prior to using a plurality of said current reported play cursor positions in said step of calculating a current estimate of a play cursor position.

14. The process of claim 13 further comprising the step of reducing latency by reducing said play cursor lead.

15. The process of claim 13 further comprising the step of maintaining a list of said plurality of said current reported play cursor positions.

16. The process of claim 13, said step of calculating a current estimate of the play cursor position further comprising the step of calculating an estimate of the play cursor position by averaging said plurality of said current reported play cursor positions.

17. The process of claim 13, said step of calculating a current estimate of the play cursor position further comprising at least one step selected from the group of steps consisting of:
   a) calculating an instantaneous sampling rate;
   b) calculating a weighted average; and
   c) interpolating a current estimated play cursor position.

18. A process for reducing latency in digital audio playback, said process comprising the steps of:
   a) calculating a repeatable play cursor lead:
   b) querying for a current reported cursor position and using a plurality of said current reported play cursor positions in said step of calculating a current estimate of a play cursor position;
   c) calculating a current estimate of the play cursor position based on a plurality of said current reported play cursor positions;
   d) adding the calculated play cursor position to the calculated play cursor lead;
   e) writing audio data to an audio buffer at the calculated play cursor position plus the calculated play cursor lead;
   f) said step of calculating a current estimate of the play cursor position further comprising at least one step selected from the group of steps consisting of:
      i) calculating an instantaneous sampling rate;
      ii) calculating a weighted average; and
      iii) interpolating a current estimated play cursor position; and
   g) reducing latency by reducing said play cursor lead based on the accuracy of said current estimate of a play cursor position.

\* \* \* \* \*